United States Patent
Baumann et al.

(10) Patent No.: US 12,355,277 B2
(45) Date of Patent: Jul. 8, 2025

(54) SYSTEM AND METHOD FOR DISENGAGING BATTERY STRINGS

(71) Applicant: Caterpillar Inc., Peoria, IL (US)

(72) Inventors: Jonathan M. Baumann, Hanna City, IL (US); Justin Dale Middleton, Peoria, IL (US); Jason Lee Miller, Princeville, IL (US); Evan Blair Stumpges, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 469 days.

(21) Appl. No.: 17/381,258

(22) Filed: Jul. 21, 2021

(65) Prior Publication Data

US 2023/0021984 A1 Jan. 26, 2023

(51) Int. Cl.
*H02J 7/00* (2006.01)
*H02J 7/14* (2006.01)

(52) U.S. Cl.
CPC .......... *H02J 7/0016* (2013.01); *H02J 7/0018* (2013.01); *H02J 7/0019* (2013.01); *H02J 7/1492* (2013.01)

(58) Field of Classification Search
CPC ...... H02J 7/0016; H02J 7/0018; H02J 7/0019; H02J 7/1492
See application file for complete search history.

(56) References Cited

U.S. PATENT DOCUMENTS

| | | | |
|---|---|---|---|
| 6,492,745 B1* | 12/2002 | Colley, III | H02J 7/0013 307/64 |
| 9,397,509 B2 | 7/2016 | Heidenreich et al. | |
| 9,525,291 B1* | 12/2016 | Huynh | B60L 3/04 |
| 2009/0223724 A1* | 9/2009 | Heckeroth | B60K 1/04 180/2.2 |
| 2010/0084999 A1 | 4/2010 | Atkinson, Jr. | |
| 2014/0062388 A1* | 3/2014 | Kim | H02J 7/0019 320/128 |
| 2017/0001584 A1* | 1/2017 | Harris | H01M 10/4207 |
| 2019/0001820 A1* | 1/2019 | Mittnacht | B60K 6/442 |
| 2019/0317153 A1* | 10/2019 | Pan | H02J 7/0047 |
| 2020/0338997 A1* | 10/2020 | Goetz | B60L 58/19 |
| 2021/0206290 A1* | 7/2021 | Li | B60L 58/14 |

* cited by examiner

*Primary Examiner* — Drew A Dunn
*Assistant Examiner* — Pamela J Jeppson
(74) *Attorney, Agent, or Firm* — xSensus

(57) ABSTRACT

A machine includes a plurality of battery string modules that supply electric current to an inverter of the machine. The machine also includes a control system that opens at one contactor coupled to at least one battery string module of the plurality of battery string modules to disconnect the at least one battery string module. The other battery string modules of the plurality of battery string modules, apart from the at least one battery string module, continue supplying electric current to the inverter of the machine while the at least one battery string module is disconnected.

14 Claims, 8 Drawing Sheets

SYSTEM AND METHOD FOR DISENGAGING BATTERY STRINGS

TECHNICAL FIELD

The present disclosure is directed to disengaging battery strings, and in particular to a system and method for disengaging individual battery strings while providing operational capabilities to a machine based on partial battery functionality.

BACKGROUND

Modern vehicles often include many high-voltage electrical devices. Specifically, battery-powered vehicles, such as electric vehicles or hybrid electric vehicles, may contain a high-voltage battery pack connected to a DC bus. High voltage devices (e.g., a high-voltage battery pack) may present challenges not present in low voltage systems. In the event of a vehicle component failure or a high-voltage battery pack failure, a short-circuited high voltage system may sustain heavy damage because of the relatively high voltage levels. To prevent this, a High Voltage Interlock Loop (HVIL) circuit is designed to open a circuit to disable high-voltage buses, powering off the entire vehicle. Since component failures may occur multiple times, triggering the HVIL circuit, the entire vehicle may be powered off several times, and render the vehicle inoperable until the issue is fixed.

U.S. Pat. No. 9,525,291 describes disengaging a battery using a controller. The controller receives signals from a Battery Management System (BMS) indicating that a faulty battery string should be disengaged, and in response, the controller reduces the current limit of a power train of the vehicle. The controller may open contactors associated with the faulty battery string after determining that a detected current reaches a desired current level. However, opening the contactors to disengage the faulty battery string may result in additional monitoring of vehicle parameters (e.g. desired current level, current limit of the power train, etc.) and create unnecessary complexity and additional cost.

SUMMARY

In a first aspect, a machine includes a plurality of battery string modules that supply electric current to an inverter of the machine. The machine also includes a control system that opens at least one contactor coupled to at least one battery string module of the plurality of battery string modules to disconnect the at least one battery string module. The other battery string modules of the plurality of battery string modules, apart from the at least one battery string module, continue supplying electric current to the inverter of the machine while the at least one battery string module is disconnected.

Another aspect is a method that includes supplying electric current from a plurality of battery string modules to an inverter of the machine. The method further includes opening at least one contactor coupled to at least one battery string module of the plurality of battery string modules to disconnect the at least one battery string module. The method also includes stopping supply of the electric current from the at least one battery string module to the inverter upon opening of the at least contactor coupled to the at least one battery string module. The method additionally includes continuing to supply the electric current to the inverter of the machine from other battery string modules of the plurality of battery string modules, apart from the at least one battery string module while the at least one battery string module is disconnected.

Another aspect is a machine including a plurality of battery string modules arranged in pairs. Further, one or more disconnect switches are coupled to the plurality of battery string modules, and a first pair of battery string modules is connected to a first disconnect switch of the one or more disconnect switches. The machine also includes a first contactor including a positive terminal coupled to a first battery string module of the first pair of battery string modules and a second contactor including a negative terminal connected to a second battery string module of the first pair of battery string modules. The machine further includes a main relay coupled to the one or more disconnect switches, the plurality of battery string modules, the first contactor, and the second contactor.

The foregoing general description of the illustrative embodiments and the following detailed description thereof are merely aspects of the teachings of this disclosure and are not restrictive.

DETAILED DESCRIPTION

Figure 1:
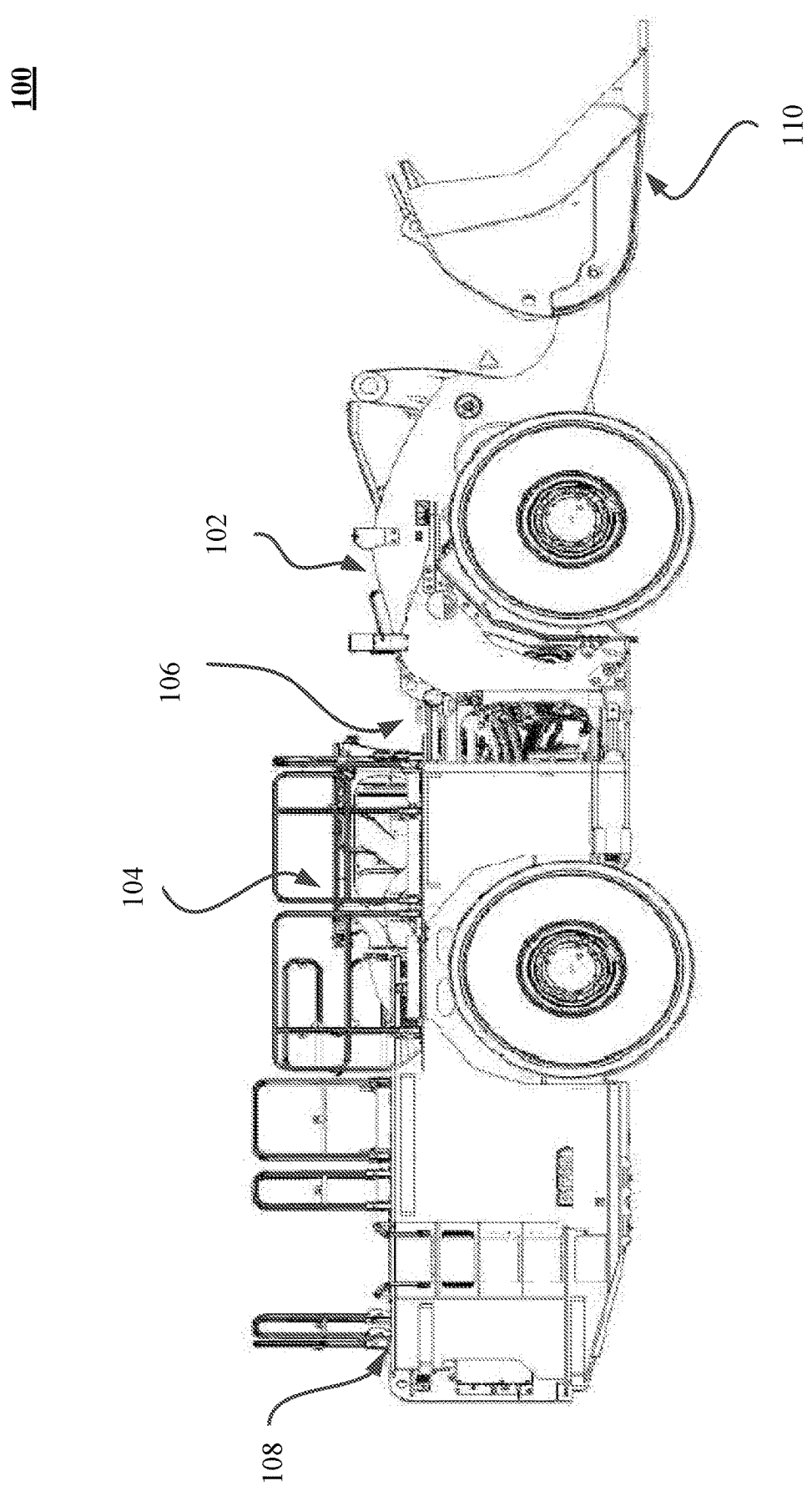
FIG. 1 is a side view of a machine, or vehicle, including a battery string disengaging system in accordance with embodiments of the disclosure.

FIG. 1 is a side view of a machine 100, or vehicle, in accordance with embodiments of the disclosure. The machine 100 is illustrated as an underground mine loader, or an earth moving machine. For example, the underground mine loader, or the earth moving machine, may be an underground mining load haul dump (LHD) loader. Though the description of FIG. 1 is made with reference to an underground mine loader for the sake of clarity, other vehicles are possible without departing from the scope of the disclosure. For example, machine 100 may be an electric vehicle, a fuel cell vehicle, a hybrid vehicle, or a conventional internal combustion engine vehicle. The machine 100 may have any body style, such as a sedan, a coupe, a sports car, a truck, a station wagon, an SUV, a minivan, or a conversion van. The machine 100 may also include construction vehicles, such as articulated trucks, asphalt pavers, bulldozers, backhoe loaders, cold planers, compactors, draglines, drills, excavators, motor graders, off-highway trucks, wheel loaders, or track loaders, although any other type of construction vehicle may also be included.

Figure 2:
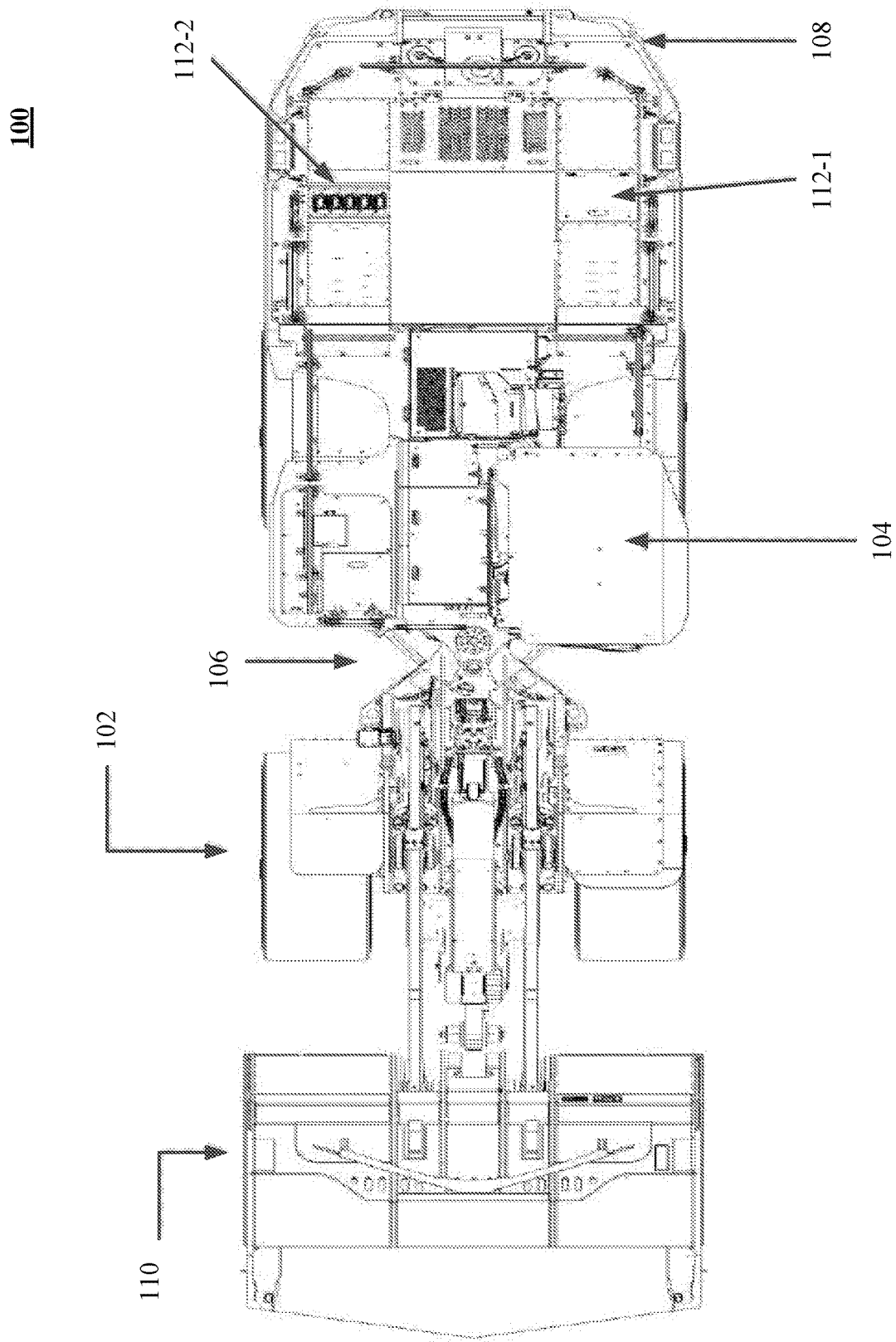
FIG. 2 is a top view of the machine of FIG. 1 illustrating a first high voltage (HV) battery string module and a second HV battery string module in accordance with embodiments of the disclosure.
Figure 3:
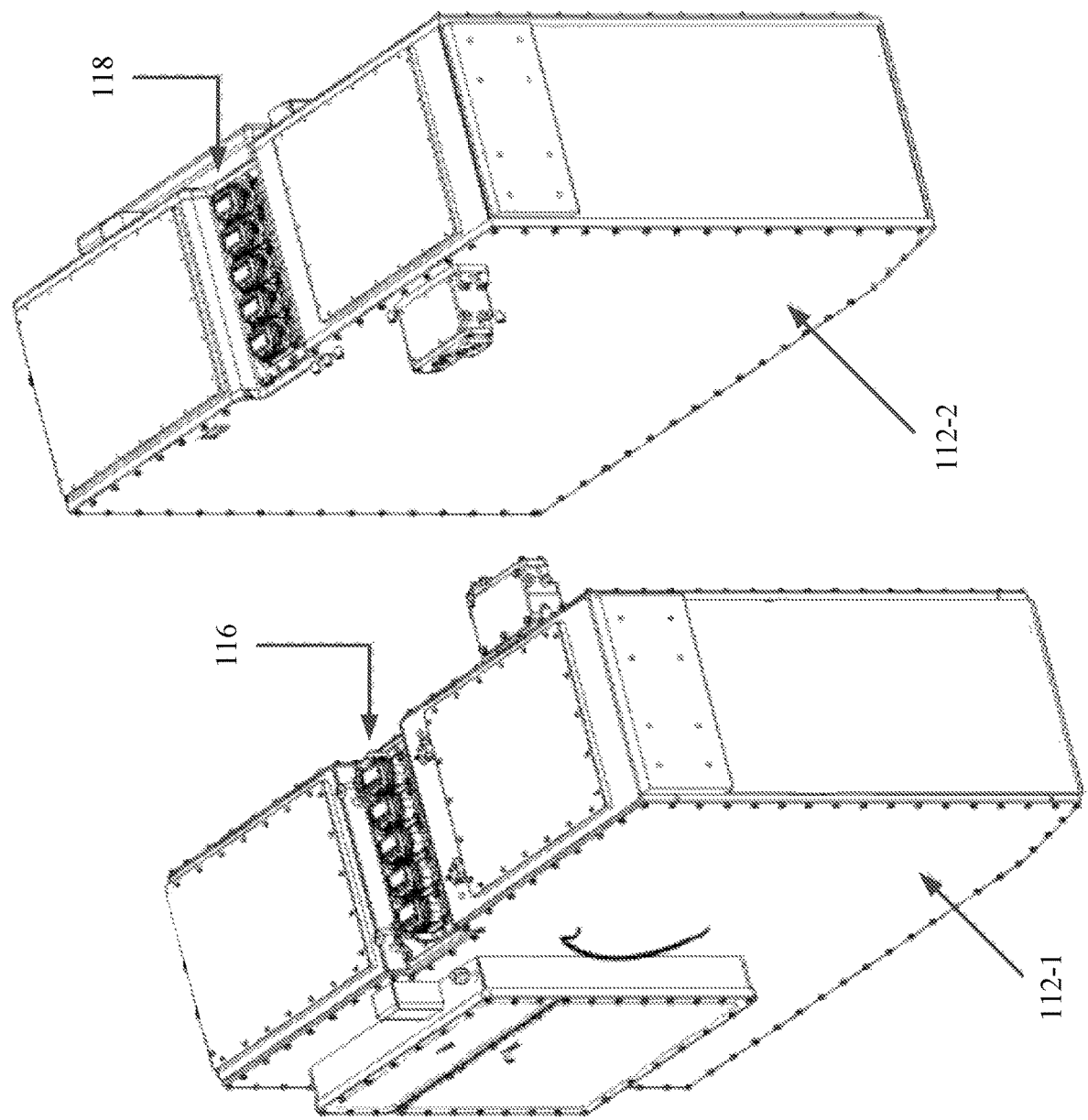
FIG. 3 is a perspective view of the first HV battery string module and the second HV battery string module in accordance with embodiments of the disclosure.

The machine 100 includes a chassis that has a front portion 102 joined to a back portion 104 at an articulation 106. The back portion 104 includes a machine battery system 108. The machine battery system 108 is mounted on the back portion 104. A plurality of battery string modules (e.g. a first HV battery string module 112-1 and a second HV battery string module 112-2 as illustrated in FIGS. 2 and 3) that supply electrical energy to power the machine 100 and are positioned in the back portion 104. Additionally, other power sources may be used to power the machine 100 in addition to the HV battery string modules 112-1 and 112-2. For example, the machine 110 may also include a diesel turbine, a microturbine powered generator, or a gasoline-powered engine. The machine 100 can include a moveable bucket 110 attached to the front portion 102 and may include other earth-moving implements without limitation.

FIG. 2 is a top view of the machine 100 of FIG. 1 and illustrates the first HV battery string module 112-1 and the second HV battery string module 112-2. The first and second HV battery string modules 112-1 and 112-2 may be positioned on either side of the machine 100 as illustrated in the FIG. 2. The first and second HV battery string modules 112-1 and 112-2 may also be positioned front-to-back in the center of the machine 100. As can be appreciated, the machine 100 may have only one HV battery string module or may have more than two HV battery string modules without departing from the scope of the disclosure. As such the number and arrangement of HV battery string modules in FIG. 2 is merely exemplary.

FIG. 3 illustrates a perspective view of the first and second HV battery string modules 112-1 and 112-2, respectively. In FIG. 3, an HV battery string disconnect 116 is illustrated on the first HV battery string module 112-1 and an HV battery string disconnect 118 is illustrated on the second HV battery string module 112-2.

Figure 4:
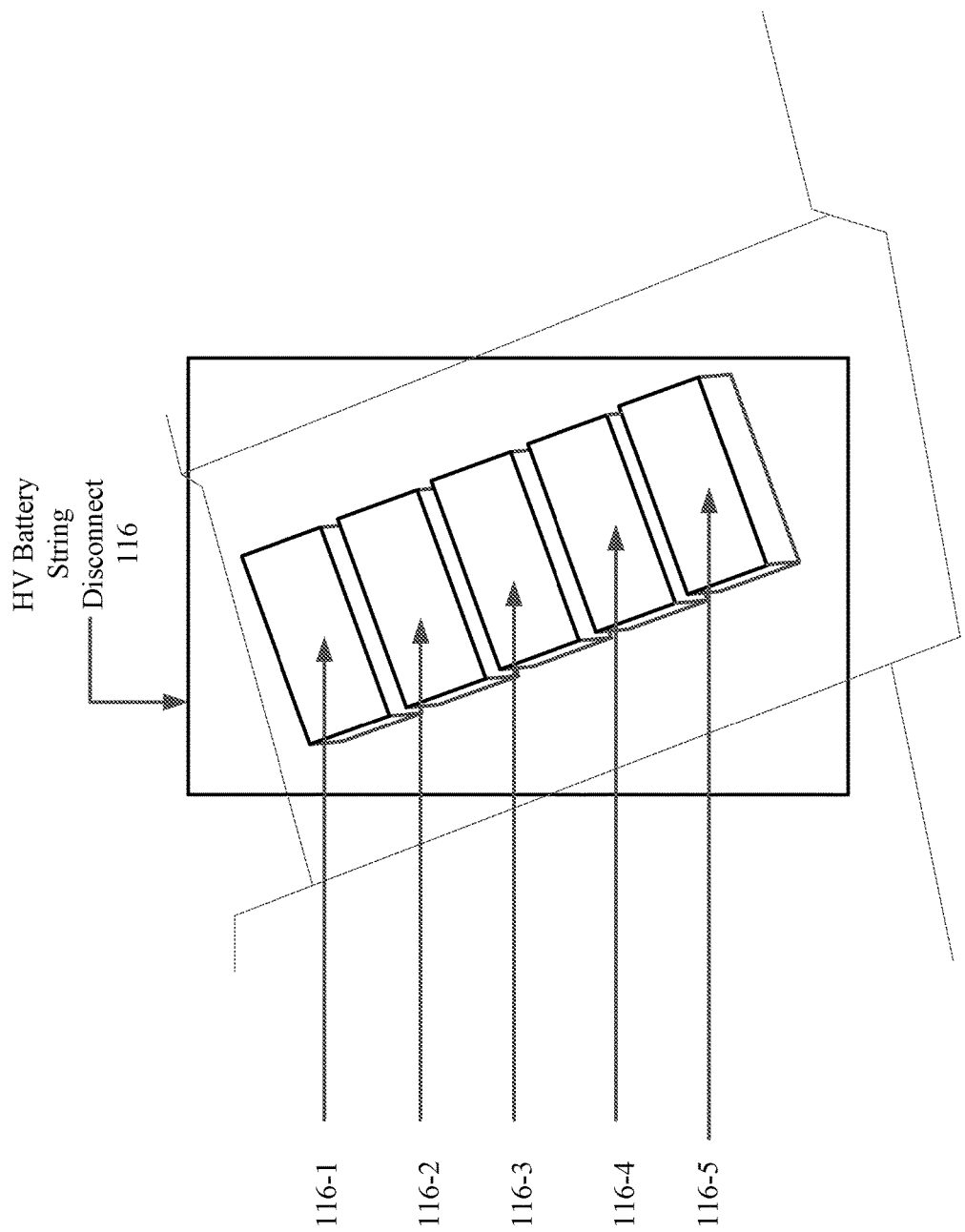
FIG. 4 illustrates HV battery string disconnects of the first HV battery string module of FIG. 3 in accordance with embodiments of the disclosure.

FIG. 4 illustrates the HV battery string disconnect 116 on the first HV battery string module 112-1 of the machine 100. By way of example, the HV battery string disconnect 116 includes a plurality of HV battery string disconnect switches 116-1, 116-2, 116-3, 116-4, and 116-5.

Figure 5:
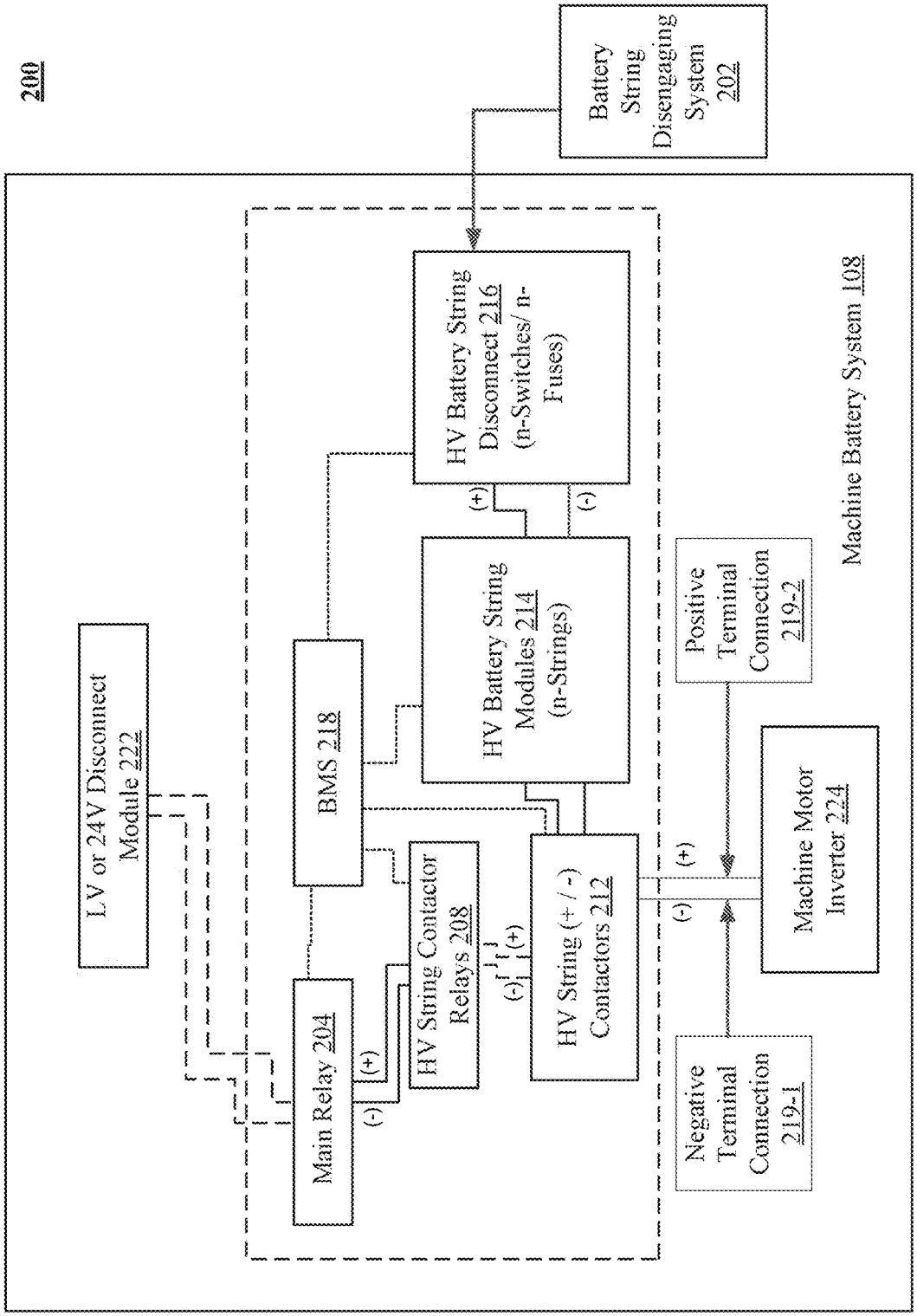
FIG. 5 is a schematic block diagram of a machine battery system in accordance with embodiments of the disclosure.

FIG. 5 is a schematic block diagram 200 of a circuit of the machine battery system 108 of the machine 100. The machine battery system 108 includes a battery string disengaging system 202. The battery string disengaging system 202 includes a main relay 204 HV string contactor relays 208, HV string contactors 212, HV battery string modules 214, HV battery string disconnects 216, and a battery management system (BMS) 218. The main relay 204 and the HV string contactor relays 208 are high voltage DC load switching relays, such as a 24 Vdc relay or a 12 Vdc relay. Of course, other high-voltage-capable relays may also be used without departing from the scope of the disclosure.

As shown in FIG. 5, the machine motor inverter 224 is connected to the HV string contactors 212 via positive and negative connections lines 219-1 and 219-2. The main relay 204 is also connected to the HV string contactor relays 208 via positive and negative connection lines. Additionally, positive and negative connection lines connect the HV string contactor relays 208 to the HV string contactors 212. Further, positive and negative connection lines connect the HV battery string modules 214 to the HV battery string disconnects 216.

The HV battery string disconnects 216 include disconnect switches as well as disconnect fuses. Additionally, the battery string disengaging system 202 also includes the BMS 218, which is coupled to the main relay 204, the HV string contactor relays 208, the HV string contactors 212, the HV battery string modules 214, and the HV battery string disconnects 216. The BMS 218 is configured to control operations of the machine 100 to provide an optimized performance of the HV battery string modules 214 while ensuring that the machine 100 complies with relevant safety standards, such as UL 2580, to avoid disruption of operations of the machine 100.

The machine battery system 108 further includes a LV (low voltage) or 24V disconnect module 222 and a machine motor inverter 224.

The LV or 24V disconnect module 222 may include a machine master disconnect module, one or more HV lead acid battery modules, and/or an HV system module, although any other component that functions to disconnect the machine 100 to avoid engine failure may also be included. The LV or 24V disconnect module 222 performs various functions in relation to protecting the machine 100 from electrical damage. One such function is to cut off all power supply to the machine 100, as part of an emergency power cut off, to protect the machine 100 from tampering, theft, and battery drain. In an embodiment, the LV or 24V disconnect module 222 operates at LV or 24 volts, though other voltages can be used in one embodiment.

The machine motor inverter 224 may include an HV junction box module, operator interface contactor modules, an inverter module, a DC-DC converter, and/or an operator interface system, although any other component that controls the operation of the machine 100 may also be included. As can be appreciated, the inverter module functions to convert a 12 volt DC current received from the battery string disengaging system 202 to a 120 volt AC current to drive the machine 100.

As can be appreciated, in FIG. 5 any number of HV string contactors 212, HV battery string modules 214, and HV battery string disconnect 216 may also be included.

Figure 6:
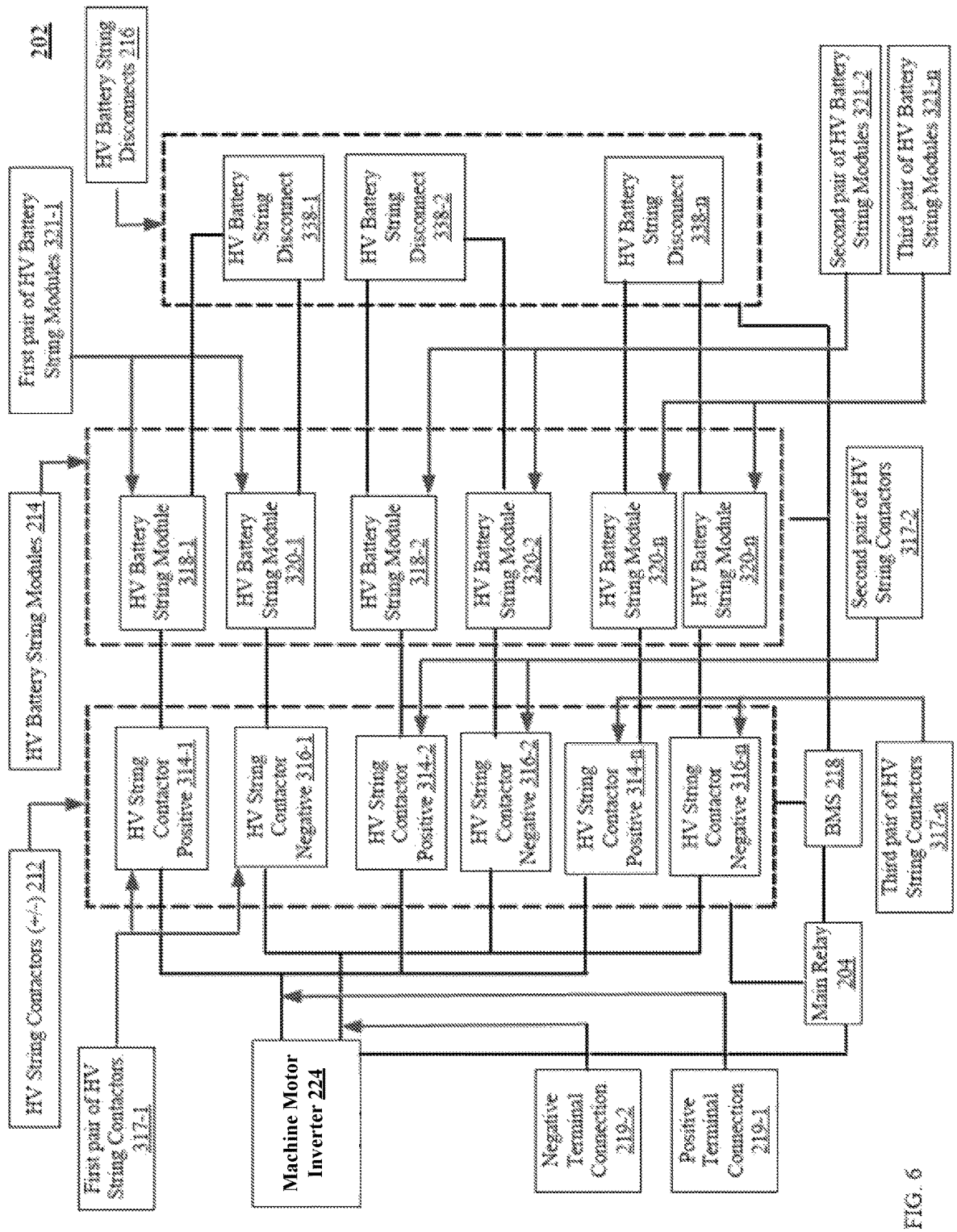
FIG. 6 is a block diagram of a battery string disengaging system in accordance with embodiments of the disclosure.

FIG. 6 is a block diagram of the battery string disengaging system 202 according to an embodiment of the disclosure. FIG. 6 illustrates, the HV string contactors 212 include HV string contactor positive terminals 314-1, 314-2, 314-$n$, and HV string contactor negative terminals 316-1, 316-2, 316-$n$. Specifically, the HV string contactors 212 include a plurality of pairs of HV string contactors (e.g. first pair of HV string contactors 317-1, second pair of HV string contactors 317-2, and $n^{th}$ pair of HV string contactors 317-1-$n$). The first pair of HV string contactors 317-1 includes an HV string contactor positive terminal 314-1 and an HV string contactor negative terminal 316-1 respectively. The second pair of HV string contactors 317-2 includes an HV string contactor positive terminal 314-2 and an HV string contactor negative terminal 316-2 respectively. The $n^{th}$ pair of HV string contactors 317-$n$ includes an HV string contactor positive terminal 314-$n$ and an HV string contactor negative terminal 316-$n$ respectively. The HV string contactor positive terminals 314-1, 314-2, 314-$n$ are respectively connected to the HV battery string modules 318-1, 318-2, 318-$n$, and the HV string contactor negative terminals 316-1, 316-2, 316-$n$ are respectively connected to the HV battery string modules 320-1, 320-2, 320-$n$.

The HV battery string modules 214 include the HV battery string modules 318-1, 318-2, 318-$n$, 320-1, 320-1, and 320-$n$. Specifically, the HV battery string modules 214 include a plurality of pairs of HV battery string modules (e.g. first pair of HV battery string modules 321-1, second pair of HV battery string modules 321-2, and $n^{th}$ pair of HV battery string modules 321-$n$). The first pair of HV battery string modules 321-1 includes the HV battery string module 318-1 and the HV battery string module 320-1. The second pair of HV battery string modules 321-2 includes the HV battery string module 318-2 and the HV battery string module 320-2. The $n^{th}$ pair of HV battery string modules 321-$n$ includes the HV battery string module 318-$n$ and the HV battery string module 320-$n$.

The HV battery string modules 214 include a plurality of strings of battery cells. Each string of the battery cells of the plurality of strings of battery cells includes two or more battery cells connected together.

The plurality of pairs of HV battery string modules 214 are connected to one of the HV battery string disconnects 216, which includes the HV battery string disconnect 338-1, the HV battery string disconnect 338-2, and the HV battery string disconnect 338-$n$. Specifically, the first pair of HV battery string modules 321-1 is connected to the HV battery string disconnect 338-1, the second pair of HV battery string modules 321-2 is connected to the HV battery string disconnect 338-2, and the $n^{th}$ pair of HV battery string modules 321-$n$ is connected to the HV battery string disconnect 338-$n$.

As can be appreciated, the HV battery string disconnect 338-1 may also include a disconnect fuse, a disconnect switch, and/or both the disconnect fuse and the disconnect switch. By way of example, with reference to FIG. 4, the HV battery string disconnect switches 116-1, 116-2, 116-3 respectively correspond to the HV battery string disconnects 338-1, 338-2, 338-$n$. Similar to the HV battery string disconnect 338-1, the HV battery string disconnect 338-2, and the HV battery string disconnect 338-$n$ may include the disconnect switch, the disconnect fuse, or both.

INDUSTRIAL APPLICABILITY

Figure 7:
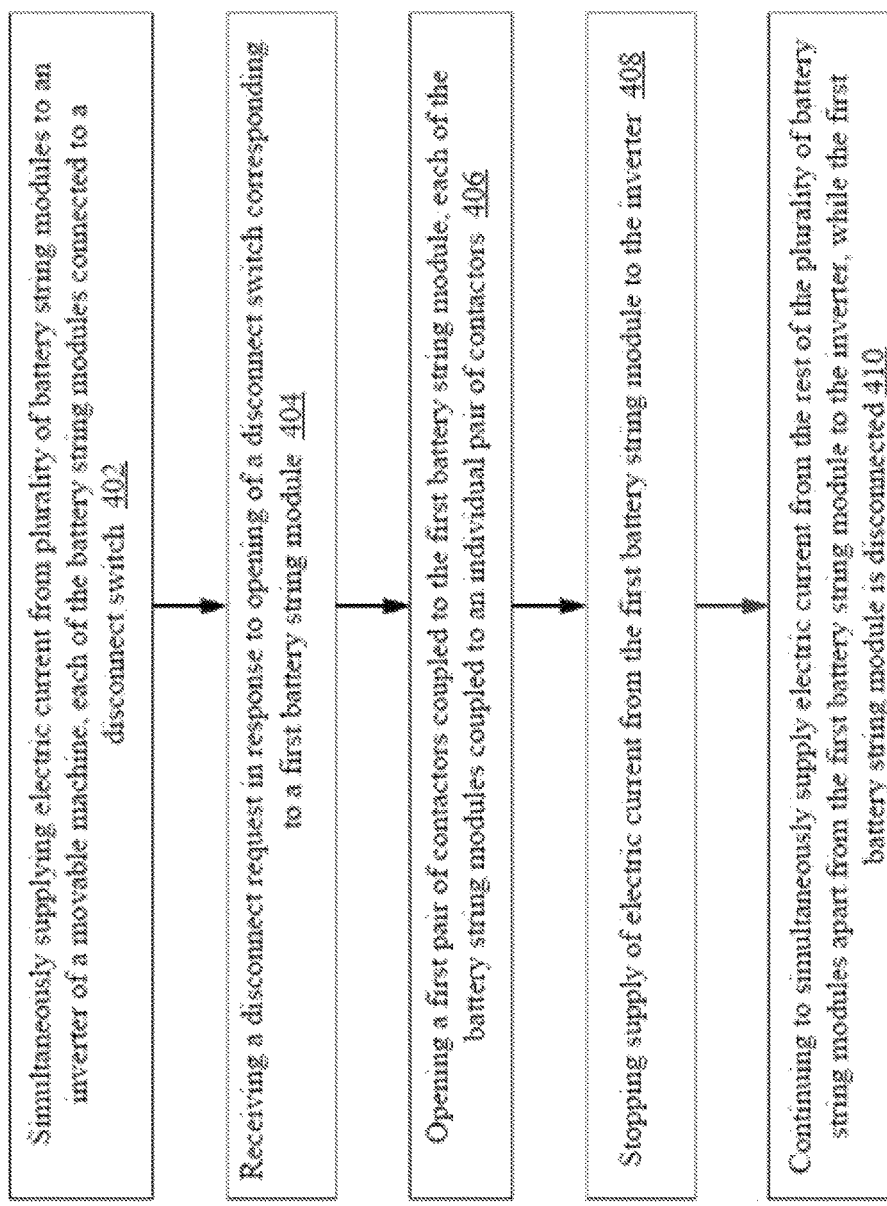
FIG. 7 is a flowchart of a method in accordance with embodiments of the disclosure.

The operation of the battery string disengaging system 202 of FIG. 6 is explained with reference to FIG. 7. FIG. 7 is a flow diagram 400 of a method for disengaging a battery string of the machine 100 according to an embodiment of the disclosure.

In step 402, with reference to FIGS. 5 and 6, the plurality of pairs of HV battery string modules 321-1, 321-2, and 321-$n$ simultaneously supply electric current to the inverter module in the machine motor inverter 224 of the machine 100. When the machine 100 is started, the main relay 204 receives a request from the BMS 218 to supply electric current to the machine motor inverter 224 and in response, the main relay 204 supplies the electric current. In this example, when the machine motor inverter 224 receives electric current, the first pair of HV string contactors 317-1 is switched on and connected to the first pair of HV battery string modules 321-1. Specifically, the HV string contactor positive terminal 314-1 is switched on and connected to the HV battery string module 318-1 and the HV string contactor negative terminal 316-1 is switched on and connected to the HV battery string module 320-1. Similarly, the second pair of HV string contactors 317-2 is switched on and connected to the second pair of HV battery string modules 321-2, and the third pair of HV string contactors 317-$n$ is switched on and connected to the third pair of HV battery string modules 321-$n$.

Accordingly, once the plurality of pairs of HV battery string modules 321-1, 321-2, and 321-$n$ are connected to the corresponding plurality of pairs of HV string contactors 317-1, 317-2, and 317-$n$ respectively, electric current is supplied simultaneously from the plurality of pairs of HV battery string modules 321-1, 321-2, and 321-$n$ to the inverter module in the machine motor inverter 224 of the machine 100.

In step 404, in response to the opening of the HV battery string disconnect 338-1, the HV battery string module 318-1 and the HV battery string module 320-1 receives a disconnect request that causes the HV battery string module 318-1 and HV battery string module 320-1 to open their connection and disengage from the circuit.

In step 406, the HV string contactor positive terminal 314-1 and the HV string contactor negative terminal 316-1 corresponding to the HV battery string module 318-1 and HV battery string module 320-1, respectively, are opened. This disconnects the first pair of the HV battery string modules 318-1 and 320-1 from the circuit and stops the supply of electric current to the machine motor inverter 224 (as shown in step 408 of FIG. 4).

Once the first pair of the HV battery string modules 321-1 are disconnected, the HV battery string module 318-1 and the HV battery string module 320-1 stop supplying electric current, however the remaining pairs of the HV battery string modules 321-2 and 321-$n$ continue to supply electric current to the inverter 232. This avoids complete disruption of the operations of the machine 100 (as shown in step 410 of FIG. 4). Further, any of the pairs of HV battery string modules 321-2 and 321-$n$, may be disconnected while others remain connected as explained above with reference to 321-1. Accordingly, any one or more than one of the pairs of HV battery string modules 321-1, 321-2, and 321-$n$ may be disconnected.

Figure 8:
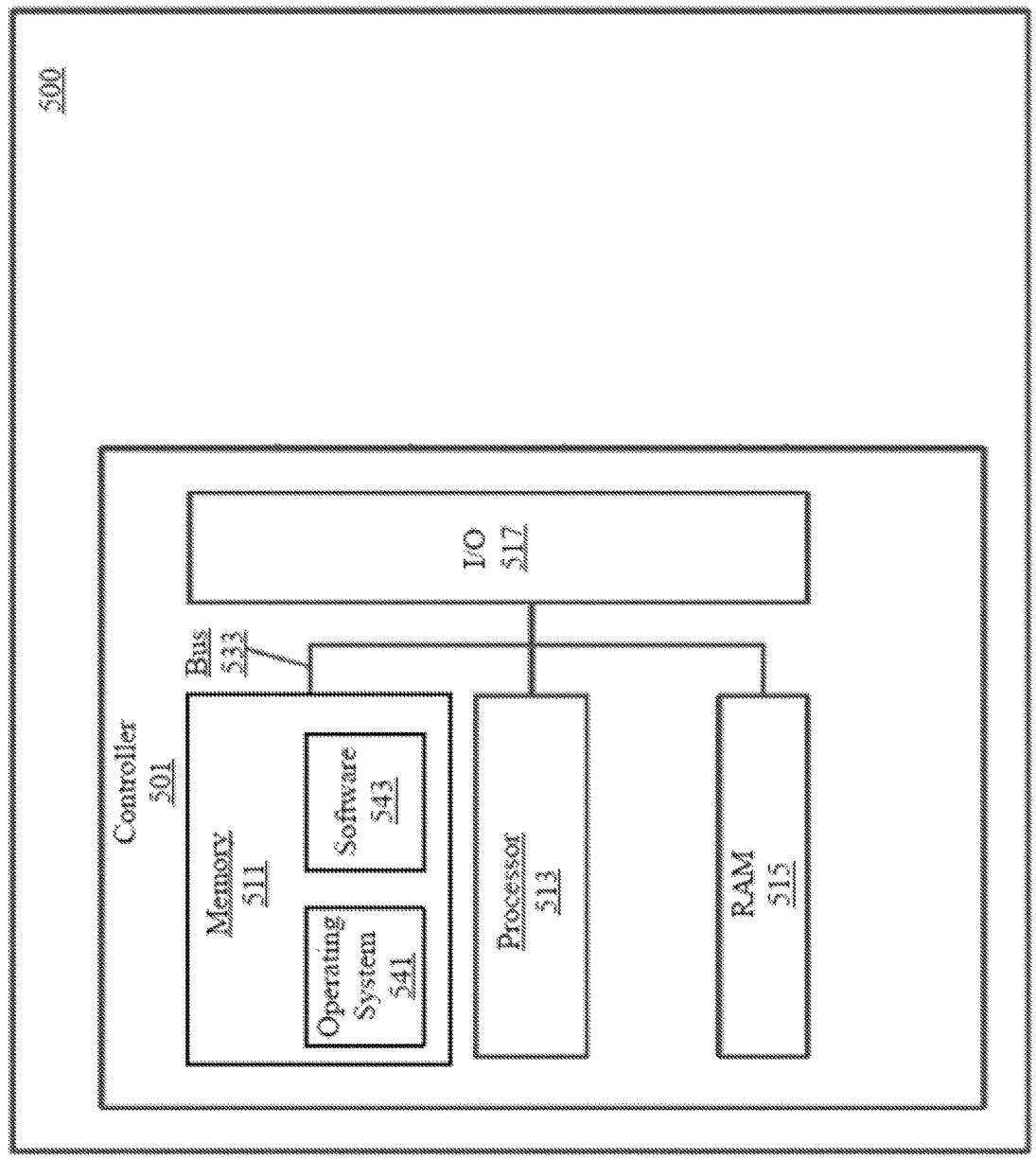
FIG. 8 is a block diagram of a system in accordance with embodiments of the disclosure.

FIG. 8 is a block diagram of a system 500 for the machine 100. In embodiments, the system 500 includes the battery string disengaging system 202.

The system 500 may include the battery string disengaging system 202 and a controller 501. In certain embodiments, the controller 501 is in communication with the battery string disengaging system 202 of the machine 100, for example, via wired and/or wireless connections. Further, the controller 501 controls the operations of the battery string disengaging system 202.

The controller 501 can include circuitry, such as a memory 511, a processor 513, a random-access memory (RAM) 515, and the input/output (I/O) circuit 517, all of which can be interconnected via a bus 533. It can be appreciated that, although only one processor 513 is shown, the controller 501 may include multiple processors 513. For example, the processor 513 may include one or more of Application Specific Integrated Circuit (ASIC), Graphics Processing Unit (GPU), Field Programmable Gate Array (FPGA), and System on Chip. The controller 501 may also include multiple RAMs 515 and multiple memories 511. As can be appreciated, at least part of the memory 511 may be removable, such as a FLASH drive, or other removable media. Although the I/O circuit 517 is shown as a single block, it can be appreciated that the I/O circuit 517 may include a number of different types of I/O circuits. The RAM(s) 515 and the memory 511 may be implemented as semiconductor memories, magnetically readable memories, and/or optically readable memories, for example. The memory 511 may also be a non-volatile memory.

The memory 511 and the RAM 515 can be a non-transitory computer-readable medium having stored thereon computer-executable code (e.g., disclosed software or sub-routines) and/or data. The memory 511 and/or the RAM 515 may store various applications (i.e., machine readable instructions) for execution by the processor 513. For example, an operating system 541 may generally control the operation of the controller 501 and provide a computing environment to implement the processes described herein. The memory 511 and/or the RAM 515 may also store a variety of software 543 for accessing specific functions of the controller 501.

Software 543 may include code to execute any of the operations described herein. The memory 511 and/or the RAM 515 may further store data related to the configuration and/or operation of the controller 501, and/or related to the operation of the software 543.

The controller 501 can be connected to the machine 100 such that information can be sent and received to and from the controller 501 and the machine 100 in order to control the machine 100. The controller 501 can instruct the machine 100 and its components to take one or more actions, such as opening the HV string contactors 212 to disconnect the HV battery modules 214 in the battery string disengaging system 202.

The HV battery string modules 214 may be used as a primary power source of a vehicle to drive various primary loads (e.g., traction motors), and each of the HV battery string modules 214, or individual battery strings thereof, may be disconnected independently of the others in accordance with the embodiments described above. This allows the machine 100 to remain at least partially operational while one or more of the HV battery string modules 214, or battery strings thereof, are disconnected.

Specifically, each of the individual HV battery string modules 214 (e.g., the HV battery string modules 318-1, 320-1, 318-2, 320-2, 318-$n$, and 320-$n$) may be connected to the HV battery string disconnects 216 (e.g., the HV battery string disconnect 338-1, 338-2, and 338-2). When any one of the HV battery string disconnects 216 (e.g., the HV battery string disconnect 338-1) opens, the corresponding HV battery string modules 214 is disconnected. However, the other HV battery string modules 318-2, 320-2, 318-$n$, and 320-$n$ apart from the HV battery string modules 318-1 and 320-1 corresponding to the HV battery string disconnect 338-1 continue to supply electric current for the continuous operation of the machine 100.

Numerous modifications and variations of the present disclosure are possible in light of the above teachings. It is therefore to be understood that within the scope of the appended claims, embodiments may be practiced otherwise than as specifically described herein.

The invention claimed is:

1. An all-electric battery-operated machine, comprising:
a plurality of high voltage (HV) battery string modules configured to supply electric current to an inverter of the all-electric battery-operated machine, the plurality of HV battery string modules being grouped as a plurality of pairs of the HV battery string modules, including a first pair having a first HV battery string module and a second HV battery string module and a second pair having a third HV battery string module and a fourth HV battery string module;
a plurality of pairs of high voltage (HV) contactors respectively associated with each said pair of the HV battery string modules, including a first pair of HV contactors and a second pair of HV contactors, a first HV contactor of each of the plurality of pairs of HV contactors being connected to a positive terminal of the inverter of the all-electric battery-operated machine and a second HV contactor of each of the plurality of pairs of HV contactors being connected to a negative terminal of the inverter of the all-electric battery-operated machine;
a plurality of high voltage (HV) battery string disconnects, including a first HV battery string disconnect and a second HV battery string disconnect, each of the plurality of HV battery string disconnects including one or more disconnect switches, being electrically coupled to a corresponding pair of the plurality of pairs of the HV battery string modules, and not being electrically coupled to any of the other pairs of the plurality of pairs of the HV battery string modules; and
a control system including processing circuitry configured to:
open at least one of the HV contactors of one of the plurality of pairs of HV contactors to disconnect the corresponding pair of HV battery string modules,
wherein all other pairs of HV battery string modules of the plurality of HV battery string modules, apart from the corresponding pair of HV battery string modules having been disconnected, are configured to continue supplying electric current to the inverter of the machine while the corresponding pair of HV battery string modules remain disconnected,
wherein each of the plurality of HV battery string disconnects is electrically coupled between the corresponding pair of the plurality of pairs of the HV battery string modules and electrically connected directly to the processing circuitry of the control system, including the first HV battery string disconnect being electrically coupled between the first and second HV battery string modules and the second HV battery string disconnect being electrically coupled between the third and fourth HV battery string modules, and
wherein the processing circuitry of the control system is configured to:
responsive to opening of the one or more disconnect switches of the first HV battery string disconnect, open at least one of the first HV contactor or the second HV contactor of the first pair of HV contactors to disconnect the first pair of HIV battery string modules without opening the first and second HV contactors of any other pair of HV contactors of the plurality of pairs of HV contactors.

2. The all-electric battery-operated machine of claim 1, further comprising:
a main relay electrically coupled to the pairs of HV contactors.

3. The all-electric battery-operated machine of claim 2, wherein each of the plurality of HV battery string disconnects includes a first disconnect switch of the one or more disconnect switches.

4. The all-electric battery-operated machine of claim 1, wherein the all-electric battery-operated machine is an all-electric battery-operated earth moving machine.

5. The all-electric battery-operated machine of claim 1, wherein each said pair of the HV battery string modules, the corresponding pair of HV contactors, and the corresponding one of the HV battery string disconnections constitutes a High Voltage Interlock Loop (HVIL) circuit, the all-electric battery-operated machine thus having a plurality of the HVIL circuits.

6. The all-electric battery-operated machine of claim 1, wherein the all-electric battery operated machine is an underground mine loader,
wherein the plurality of pairs of the HV battery string modules consist of n number of pairs of the HV battery string modules,
wherein the plurality of HV battery string disconnects consist of n HV battery string disconnects, and
wherein n is a positive integer greater than two.

7. The all-electric battery-operated machine of claim 6, wherein n equals five.

8. The all-electric battery-operated machine of claim 6, wherein n equals ten.

9. A method regarding voltage control for an all-electric battery-operated vehicle,
wherein the all-electric battery-operated vehicle includes:
a plurality of high voltage (HV) battery string modules configured to supply electric current to an inverter of the all-electric battery-operated vehicle, the plurality of HV battery string modules being grouped as a plurality of pairs of the HV battery string modules, including a first pair having a first HV battery string module and a second HV battery string module and a second pair having a third HV battery string module and a fourth HV battery string module;
a plurality of pairs of high voltage (HV) contactors respectively associated with each said pair of the HV battery string modules, including a first pair of HV contactors and a second pair of HV contactors, a first HV contactor of each of the plurality of pairs of HV contactors being connected to a positive terminal of the inverter of the all-electric battery-operated vehicle and a second HV contactor of each of the plurality of pairs of HV contactors being connected to a negative terminal of the inverter of the all-electric battery-operated vehicle;
a controller; and
a plurality of high voltage (HV) battery string disconnects, including a first HV battery string disconnect and a second HV battery string disconnect, each of the plurality of HV battery string disconnects including one or more disconnect switches, being electrically coupled to a corresponding pair of the plurality of pairs of the HV battery string modules and not any of the other pairs of the plurality of pairs of the HV battery string modules, including the first HV battery string disconnect being electrically connected between the first and second HV battery string modules and the second HV battery string disconnect being electrically connected between the third and fourth HV battery string modules, and being electrically connected directly to the controller,
wherein the method comprises:
supplying electric current from the plurality of HV battery string modules to the inverter of the all-electric battery-operated vehicle;
opening, under control of the controller, and in response to opening of the one or more disconnect switches of the first HV battery string disconnect, at least one of the first HV contactor or the second HV contactor of the first pair of HV contactors to disconnect the first pair of HV battery string modules without disconnecting any other pair of HV battery string modules;
stopping supply of the electric current from the disconnected corresponding pair of HV battery string modules to the inverter responsive to opening of the at least one of the HV contactors of one of the pairs of HV contactors; and
continuing to supply the electric current to the inverter of the all-electric battery-operated vehicle from all other pairs of HV battery string modules of the plurality of HV battery string modules, apart from the first pair of HV battery string modules having been disconnected while the first pair of HV battery string modules remain disconnected,
wherein each of the plurality of HV battery string disconnects is electrically coupled between the corresponding pair of the plurality of pairs of the HV battery string modules.

10. The method of claim 9,
wherein the all-electric battery-operated vehicle further includes a main relay electrically coupled to the pairs of HV contactors, and
wherein the method further comprises:
opening the main relay to electrically disconnect all of the pairs of high voltage (HV) contactors.

11. The method of claim 9, further comprising receiving an electronic disconnect request responsive to opening of the one or more disconnect switches of the first HV battery string disconnect corresponding to said at least one of the first HV contactor or the second HV contactor of the of the first pair of contactors to be disconnected for said opening.

12. The method of claim 9,
wherein the all-electric battery operated vehicle is an underground mine loader,
wherein the plurality of pairs of the HV battery string modules consist of n number of pairs of the HV battery string modules,
wherein the plurality of HV battery string disconnects consist of n HV battery string disconnects, and
wherein n is a positive integer greater than two.

13. The method of claim 12, wherein n equals five.

14. The method of claim 12, wherein n equals ten.

* * * * *